United States Patent [19]

Söderberg

[11] Patent Number: 5,487,255
[45] Date of Patent: Jan. 30, 1996

[54] BALE, AN APPARATUS AND A METHOD FOR THE WRAPPING OF A BALE IN TWO CROSSING WRAPPING LAYERS APPLIED IN OVERLAPPING HELICAL TURNS

[76] Inventor: Staffan Söderberg, Hälleby Gård, Hölö S-150 16, Sweden

[21] Appl. No.: 394,306

[22] Filed: Feb. 24, 1995

Related U.S. Application Data

[62] Division of Ser. No. 129,114, Oct. 25, 1993.

[30] Foreign Application Priority Data

Apr. 8, 1991 [SE] Sweden ................................. 9101032

[51] Int. Cl.⁶ .............................................. B65B 13/02
[52] U.S. Cl. .................. 53/399; 53/211; 53/588
[58] Field of Search ........................... 53/556, 211, 212, 53/389.5, 465, 587, 399, 588

[56] References Cited

U.S. PATENT DOCUMENTS 4,281,500  8/1981  Mueller et al. .......................... 53/465
4,972,656  11/1990  Haugstad .................................. 53/211
5,042,225  8/1991  Drury et al. .............................. 53/211
5,184,499  2/1993  Hannen ..................................... 53/588
5,195,301  3/1993  Martin-Cocher et al. ................. 53/587

Primary Examiner—Lowell A. Larson
Assistant Examiner—Gene L. Kim
Attorney, Agent, or Firm—Pearne, Gordon, McCoy & Granger

[57] ABSTRACT

A method for packaging bales with strips of plastic packaging film, in which a bale is rotated about a generally horizontal axis and, when appropriate, about a generally vertical axis, and wherein film is taken from a film magazine spaced from the bale and wrapped around the bale in successive turns while maintaining the film under tension, and wherein the film in each turn of film around the bale extends generally parallel with and transversely to the horizontal axis. The bale is then wrapped with a further wrapping of film such that successive turns of this further wrapping cross-over those parts of the underlying film which extend generally parallel with the horizontal axis in a manner to retain the underlying turns. The film material is held under tension while being applied.

20 Claims, 4 Drawing Sheets

BALE, AN APPARATUS AND A METHOD FOR THE WRAPPING OF A BALE IN TWO CROSSING WRAPPING LAYERS APPLIED IN OVERLAPPING HELICAL TURNS

This is a divisional of application Ser. No. 08/129,114, filed Oct. 25, 1993.

BACKGROUND OF THE INVENTION

The present invention relates to a method for wrapping or packaging bales in strips of plastic packaging film, in which the bale is rotated about a generally horizontal axis and, when appropriate, also about a generally vertical axis, and in which packaging film is taken from a film magazine located at a distance from the bale and wrapped in successive turns around the entire bale while maintaining a tension force in the film, and in which the film in each turn extends essentially parallel with and transversely to the horizontal axis.

The invention also relates to an arrangement for carrying out the method, and to bales.

Methods and arrangements of the aforesaid kind are known essentially. One large area of use is found in the wrapping of bales of animal fodder, ensilage, which is still not dry and which is to be wrapped in an air-impervious plastic film wrapping. Present-day bales have an essentially circular cross-section, i.e. they are not parallel-epipedic.

The known technique, however is encumbered with serious drawbacks. In order for ensilage to be wrapped in the manner intended, it is necessary for the wrapped bale to be truly airtight. Even though the film wrapper is maintained under considerable tension as it is wound, it is extremely difficult to achieve the requisite tension in the wrapper and requisite retention of the wrapping material around the bale, particularly on those parts of respective turns which are parallel with the horizontal axis. At times, the joints produced with the aid of glue applied to the side of the film which faces towards the bale are insufficiently strong, therewith allowing moisture and air to enter the bale material. This ingress of air and moisture will destroy the bale material, due to mould growth among other things. Toxic substances are also likely to form. When moisture is present, the adhesive force exerted by the glue will diminish progressively, thereby quickly worsening the situation. The problem is, of course, still greater in the absence of glue joints. One contributory factor to the described moisture susceptibility with insufficient retention of the wrapping turns is that the joints on one of the turn-parts parallel with the horizontal axis of each turn opens upwardly and is therefore susceptible to rain, etc. On the other of these two parts of the turn, however, the joints are downwardly open, i.e. a certain "roof tile effect" is obtained.

When practicing the known technique, it cannot be guaranteed that a uniform and high bale material quality will be achieved.

The problems of poor wrapper tension and poor wrapper retention increase when passing from cylindrical bales to generally parallelepipedic bales, this transition being desirable for storage and transportation reasons, among other things. This worsening of the problem is mainly because the sides of a parallelepipedic bale are mutually parallel and because when wrapped, the bale has a certain dog-leg configuration, which further impairs the situation.

SUMMARY OF THE INVENTION

The present invention relates to a method and to an arrangement by means of which the aforesaid problems are solved. Thus, the invention provides an impervious and moisture-insensitive bale.

Thus, the invention relates to a method for wrapping or packaging bales in bands of plastic packaging film, wherein a bale is rotated about a generally horizontal axis and, when appropriate, also about a generally vertical axis, wherein film is taken from a film magazine spaced from the bale and wrapped around the entire bale in successive turns while maintaining the film band under tension, and wherein the film in each wrapping turn around the bale extends generally parallel with and transversely to said horizontal axis.

The method is mainly characterized in that further bale wrapping film is applied to the bale while maintaining an elastic tension force or stretch in said film, wherein successive turns of this further bale wrapping film cross over those parts of the film-turns of the underlying film which extend generally parallel with said horizontal axis such as to retain said film turns.

The invention also relates to an arrangement for wrapping bales in strips of plastic packaging film, comprising means for rotating a bale about a generally horizontal axis and, when appropriate, about a generally vertical axis, a film magazine spaced from said bale, means for removing film from said film magazine while maintaining the film under tension, and means for wrapping the film band in successive turns around the bale, wherein according to a first wrapping method the film is wrapped around the entire bale with the film in each wrapping turn extending generally parallel with and generally transversely to the horizontal axis of the bale, and wherein in accordance with a second wrapping method film is wrapped around the outer bale surface with the film in each wrapping turn extending generally transversely to the direction of the horizontal axis of the bale.

The arrangement is mainly characterized in that wrapping of a bale is intended to be effected first in accordance with said first wrapping method and then in accordance with said second wrapping method, such that further film, in accordance with said second wrapping method, is applied to the bale in successive wrapping turns, wherein said further wrapping turns cross-over in an elastically tensioned and retaining state the underlying parts of the wrapping turns which extend generally parallel with said horizontal axis; wherein in those instances when the bale is supported for rotation about a generally vertical axis by means of a supporting device, the supporting device is intended to achieve through oscillatory, alternating, limited rotation reciprocating winding of turns of said further film with a given turn pitch, and in those cases when the film magazine is mounted for pivotal movement about a generally vertical axis, and therewith around the bale, the film magazine is intended to produce reciprocal winding of turns of said further film at a given turn pitch through oscillatory, alternating, limited swinging movement of the film magazine.

The invention also relates to a bale, primarily an ensilage bale, wrapped in band-like packaging film, wherein the entire bale is wrapped in a first wrapping comprising successive turns of film applied while maintaining tension in said film and rotating the bale about a substantially horizontal axis and extending parallel with and transversely to said horizontal axis.

The bale is mainly characterized in that the wrapping includes a second winding of additional film which is applied subsequent to applying the first winding while maintaining the film under tension, such that successive turns of said further film will cross-over those parts of the turns of the first winding which extend generally parallel with said horizontal axis in an elastically stretched state such as to retain or hold firm the turns of said first winding.

BRIEF DESCRIPTION OF THE DRAWINGS

The invention will now be described in more detail with reference to exemplifying embodiments thereof and also with reference to the accompanying drawings, in which.

DETAILED DESCRIPTION OF THE PREFERRED EMBODIMENTS

Figure 1:
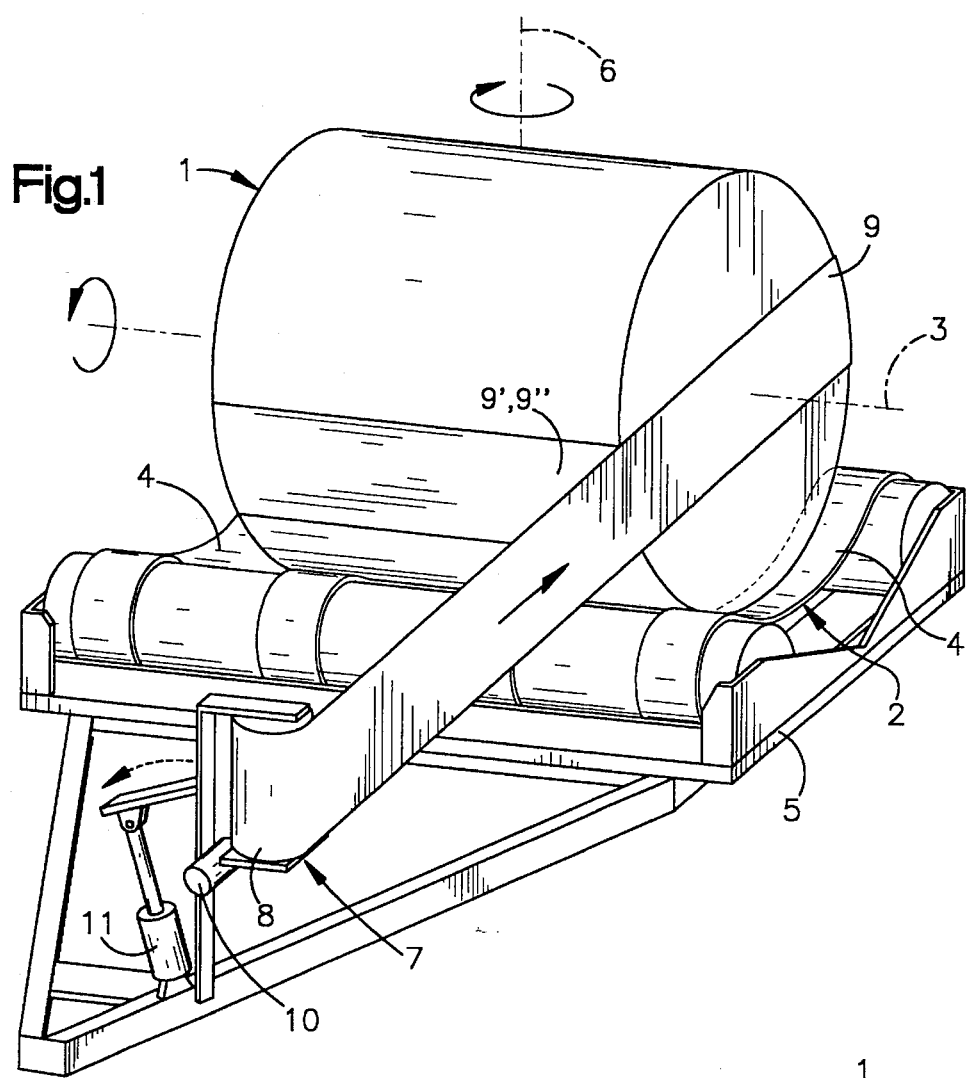
FIG. 1 is a perspective view of a first embodiment of an inventive arrangement.

FIG. 1 illustrates an exemplifying embodiment of an arrangement for packaging bales 1. The arrangement includes an endless conveyor belt 2 which is intended to rotate the bale about a generally horizontal axis 3. In the illustrated case, there is formed in the belt 2 a hollow 4 which extends generally in the direction of the horizontal axis 3 and in which a bale 1 is intended to be rotated. The conveyor belt is supported by a support structure 5, a table structure, which can be rotated separately about a generally vertical axis 6, thereby enabling the bale 1 to be rotated or turned about a generally horizontal 3 and a generally vertical axis 6.

Spaced from the bale 1 is a film magazine 7, which in the illustrated case has the form of a film roll 8 from which film 9 is intended to run to the bale while maintaining tension force in the film. Although not shown, means are provided for applying a braking force in the vicinity of or to the film magazine in order to obtain and maintain the tension force.

Figure 2:
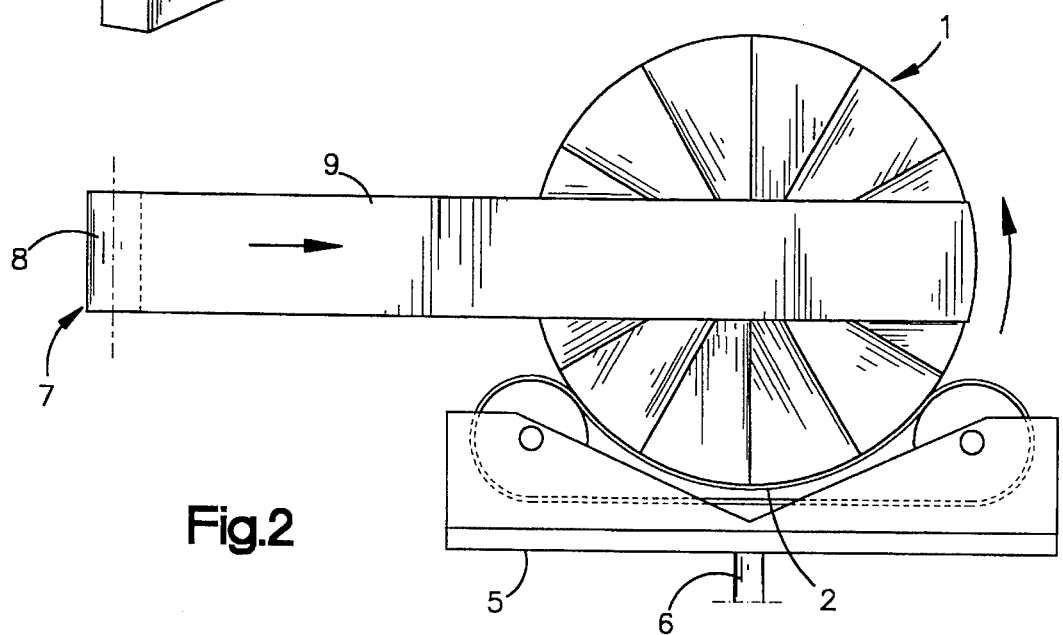
FIG. 2 is a side elevational view of the FIG. 1 arrangement.

According to a first winding or wrapping method, the film is wrapped around the entire bale 1 in successive, preferably overlapping turns, such that the film in each turn 9' around the bale will extend generally parallel with and transversely to the horizontal axis 3, as shown in FIGS. 1 and 2. In this case, the bale is rotated around the horizontal axis 3 and the vertical axis 6. According to one alternative, not shown, the film magazine 7 is arranged for rotation around the bale, in which case it is the film magazine which is rotated, or swung, around a preferably generally vertical center axis, the rotational axis of the magazine, and not the bale.

Figure 3:
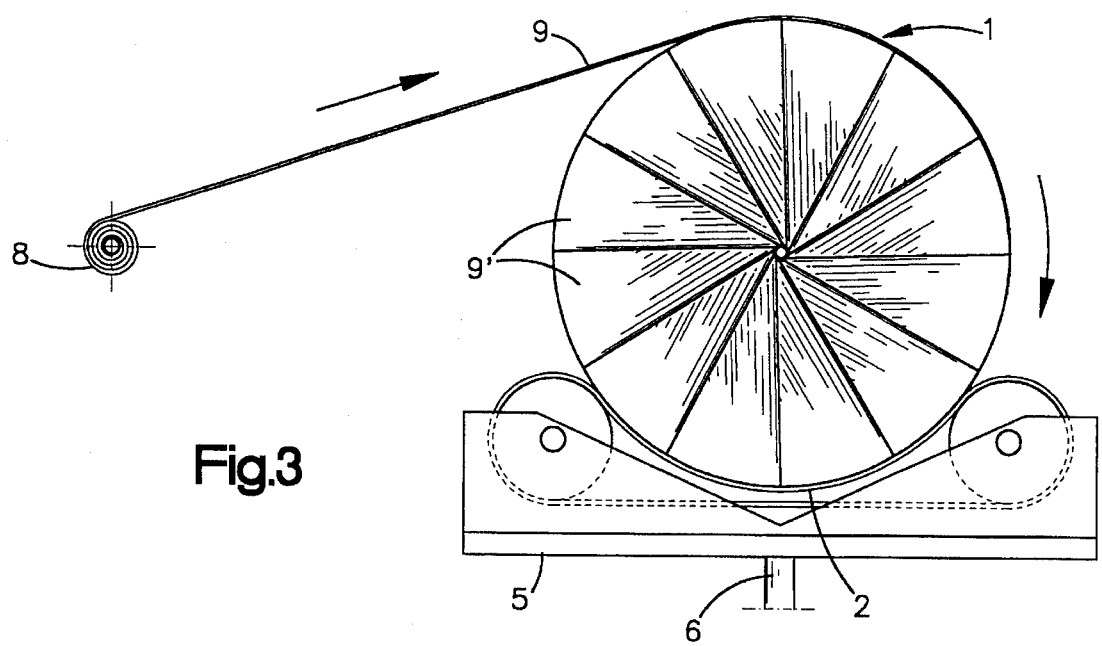
FIG. 3 is a schematic illustration of the arrangement shown in FIGS. 1 and 2, seen in the same direction as FIG. 2 and shows the application of film in accordance with the invention.
Figure 4:
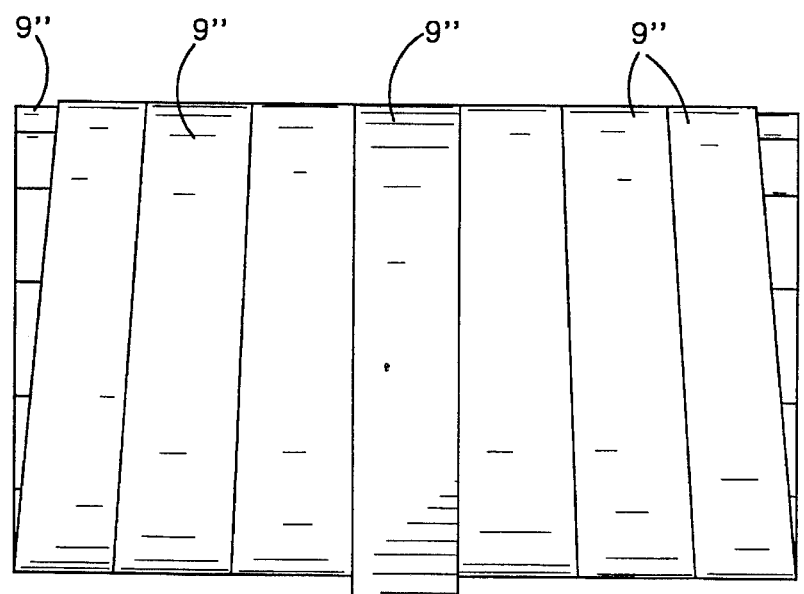
FIG. 4 is a schematic illustration of the FIG. 3 arrangement, as seen from above in FIG. 3.

When the entire bale has been packaged by this first wrapping or winding method, additional film 9 is wrapped around the bale 1 in accordance with a second wrapping or winding method, FIGS. 3 and 4, this further film being applied in successive preferably mutually at least partly overlapping turns 9" in a manner to cross-over those parts 9'" of the underlying film turns 9' that extend generally parallel with the horizontal axis 3 in a manner to firmly hold the underlying wrapping through the action of the elastic holding force in the tensioned film wrapping band. This further film is applied while rotating the bale 1 solely about said horizontal axis.

In order to obtain a given pitch in the film turns 9" of said further film material, the bale 1 is at least limitedly rotatable about a generally vertical axis, this rotation of the bale being achieved in the case of the illustrated embodiment by means of the table 5. The film wrapping material is wound backwards and forwards by alternating, oscillating, limited rotation of the table. The partial oscillation of the table 5, while the supply roll is axially stationary, allows the winding of the wrapper along the length of the bale to create overlapping turns 9".

In the case of an embodiment in which the film magazine 7 can be swung around the bale 1, the pitch of the further film turns 9" is achieved by arranging the film magazine for at least limited rotation and also for at least limited movement in the direction of said horizontal axis, wherein reciprocating winding of the film material around the bale is achieved by limited alternating, oscillating, rotary movement of the film magazine around said rotational axis.

According to one preferred embodiment, the film magazine thus includes a rotatable roll of film which, when applying film in accordance with the first wrapping method, is intended to take a first position in which the roll axis extends generally vertical and which, when applying further film in accordance with the second wrapping method, is intended to take a second position in which the roll axis is generally horizontal, wherein the roll can preferably be lowered and raised between these positions. In the illustrated embodiment the roll axle is pivotally mounted on a pivot means 10 and a preferably hydraulic piston-cylinder device 11. In this particular case, both the first wrapping method and the second wrapping method are intended to be carried out in one and the same wrapping arrangement, i.e. in one and the same wrapping or winding station.

Arrangements which have a higher total production capacity are also conceivable, where the first wrapping method is carried out in a first wrapping station and the second wrapping method is carried out in a second wrapping station, wherein wrapping or winding in crosswise fashion of the wrapping of the entire bale achieved in the first station is carried out in the second station. In this case, with regard to said first station, the arrangement can either be of the kind in which a bale 1 is supported on the table 5, FIG. 1, which can be rotated about a generally vertical axis 6, or of the kind in which the film magazine is rotatable about a bale, as mentioned briefly above.

Thus, when wrapping of the bale 1 in accordance with the first wrapping method in the first station is completed, the bale is transferred by suitable means and in a suitable manner to a second wrapping or winding station where the bale is wrapped in accordance with the second wrapping method, subsequent to severing the film extending from the bale to the film magazine in the first station, and thereby breaking the connection of the bale with said first station.

Similar to the first station, the second station may either be of the kind which includes a rotatable table 5, or of the kind which includes a rotatable, swingable, film magazine 7.

Figure 5A:
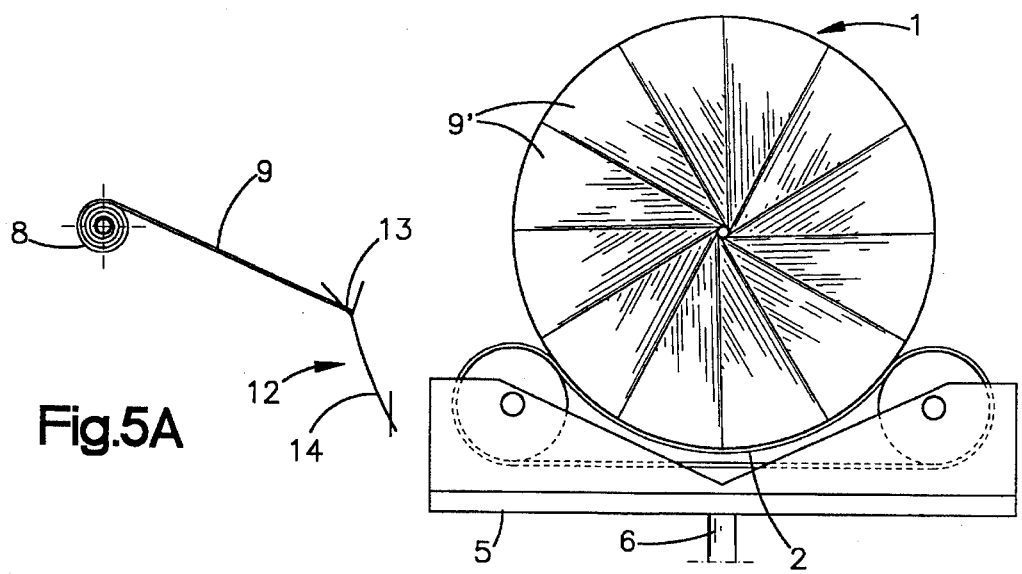
FIGS. 5a–5c illustrate schematically an arrangement for securing plastic film to a bale and winding the film in a crossing direction in a second winding or wrapping station, the arrangement being shown from the same direction as in FIG. 3.
Figure 5B:
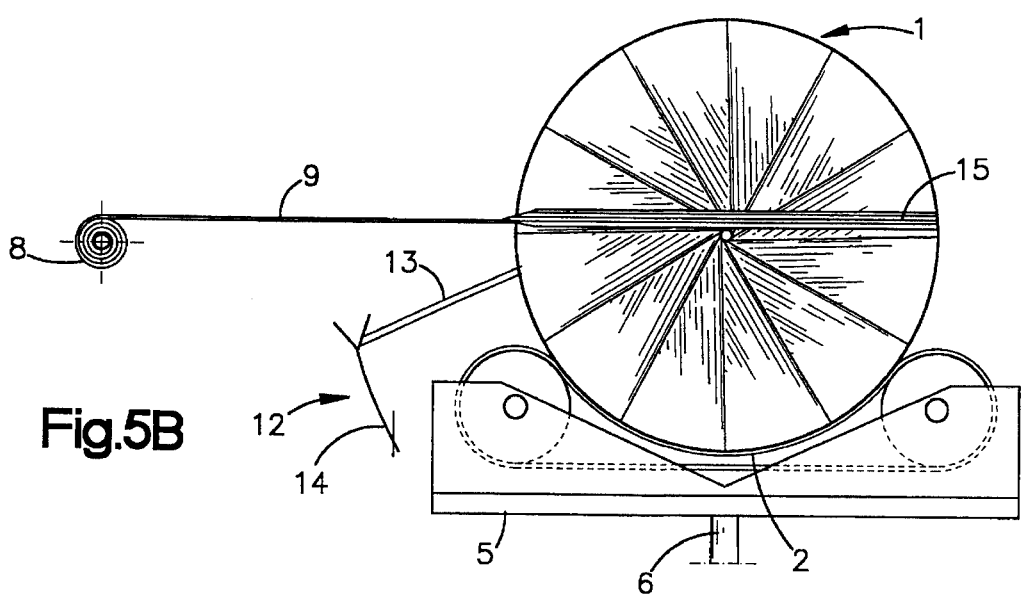
Figure 5C:
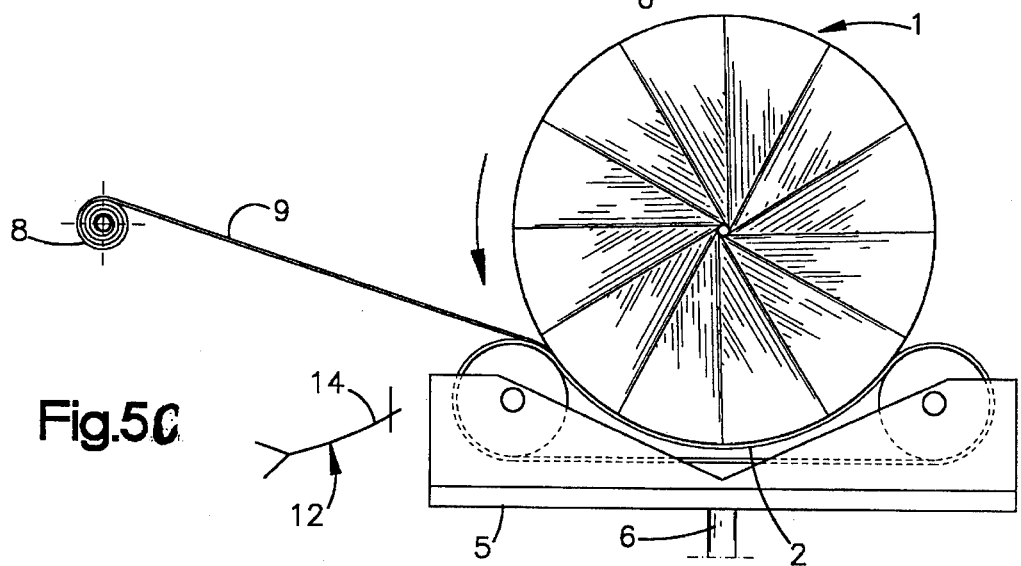
Figure 6:
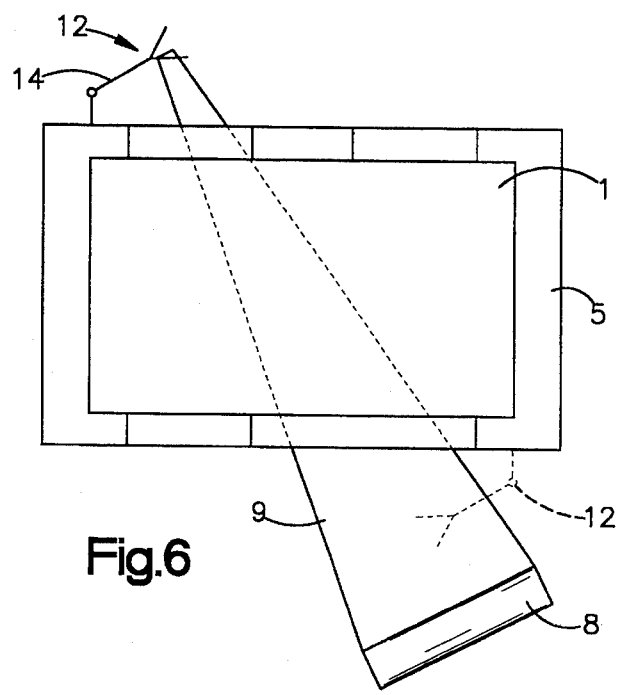
FIG. 6 illustrates schematically an arrangement for winding or wrapping plastic film in a crossing direction firmly to a bale in a second winding or wrapping station.

Various methods and arrangements are conceivable for securing film material in the second station to the bale wrapped in the first station. According to a first embodiment, FIGS. 5a–c, in which the arrangement in the second station includes a rotatable table 5, appropriate film holding and film separating devices 12 are provided adjacent the table 5 and function, for instance, to sever a wrapped bale from the film magazine by clipping or likewise cutting the film, and then to hold the film end 13 connected to the film magazine 7, as indicated in FIG. 5a, where the holding and separating device is intended to be brought into a film web separating position, for instance by means of a pivotal arm 14 or the like. In the case of the embodiment illustrated in FIGS. 5a–c, the film is intended to be fastened to the bale located on the table by initially rotating the table 5 about the axis 6, for example through one revolution, whereupon the film is taken from the magazine 8 and wrapped around the bale, FIG. 5b, therewith forming at least a part of a fixed turn 15, preferably a complete fixed turn, around the bale. It is also conceivable to apply more than one fixed turn 15. Winding of the film in a cross-over fashion is then commenced, by rotating the bale about its horizontal axis, said bale preferably being rotated in an counter-clockwise direction in FIG. 5c, so as to draw the film in beneath the bale. When bale rotation has begun, the holding and separating device is intended to release the end 13 of the film. As earlier described, the film is wound around the bale during limited oscillatory rotation of the table, so that the film will be distributed across the outer surface of the bale. Upon completion of this bale wrapping process, the bale is separated from the magazine and the end of the film attached to the magazine is held by the holding device. According to one variant, both a rotatable table and a holding and separating device are used, and the table together with the device is intended to rotate to a limited extent, such as through one-half of a revolution, from a position corresponding to the position in FIG. 5a, in which film is withdrawn from the magazine and laid over the table, FIG. 6, prior to placing a bale on the table 5. As illustrated schematically in FIG. 6, a bale is placed on the film thus laid over the table, therewith clamping the film firmly between the bale and the table. Any adhesive on the film will assist in holding the film firmly on the bale wrapped in the first station. Rotation of the bale around its horizontal axis is then commenced, preferably counter-clockwise in an arrangement corresponding to the FIG. 5a arrangement, wherein the film is drawn in beneath the bale and the end of the film is released from the holding device 12. This results in firmer attachment of the film to the bale and wrapping of the bale in accordance with the second wrapping method can be completed in the earlier described manner and the bale separated from the magazine. According to one preferred embodiment, also applicable in the two last described embodiments, the film magazine is swingable about a generally vertical axis so as to adapt to the different positions of the film along the outer surface of the bale, the axial extension of the film magazine being generally horizontal when applying the cross-over winding or wrapping.

Attachment of the film to the bale in the second station can be effected essentially in a corresponding manner in those instances when the arrangement is of the kind which includes a film magazine that can be swung around the bale. This arrangement will also include a holding and separating device 12 separate from the film magazine. According to a first embodiment, the film is attached to the bale by swinging the magazine, for instance, in a manner to obtain one fixed turn around the bale. The bale is then rotated about its horizontal axis so as to wind the film material in a cross-over fashion according to the second winding method, while swinging the film magazine, said bale preferably being rotated so that film is drawn in beneath the bale. The film is preferably released from the holding device 12 as said rotation is commenced. According to another embodiment, the holding and separating device includes a pivotal arm or like member (not shown) which functions to move the film-end connected to the magazine from a film separating position and across the table, therewith drawing film from the magazine and placing the film over the table. A bale is then placed on the table, clamping the film firmly between the bale and the table and fastening said film to the bale. Cross-over winding of the film around the bale is effected by rotating the bale about its horizontal axis, preferably so that film will be drawn in beneath the bale. The film is released from said device as the bale begins to rotate about its horizontal axis. It is also preferred in the two latest described embodiments in which the axis of the film magazine is generally horizontal that the magazine can be swung around a generally horizontal axis so as to adapt to the different positions of the film along the outer surface of the bale.

Figure 7:
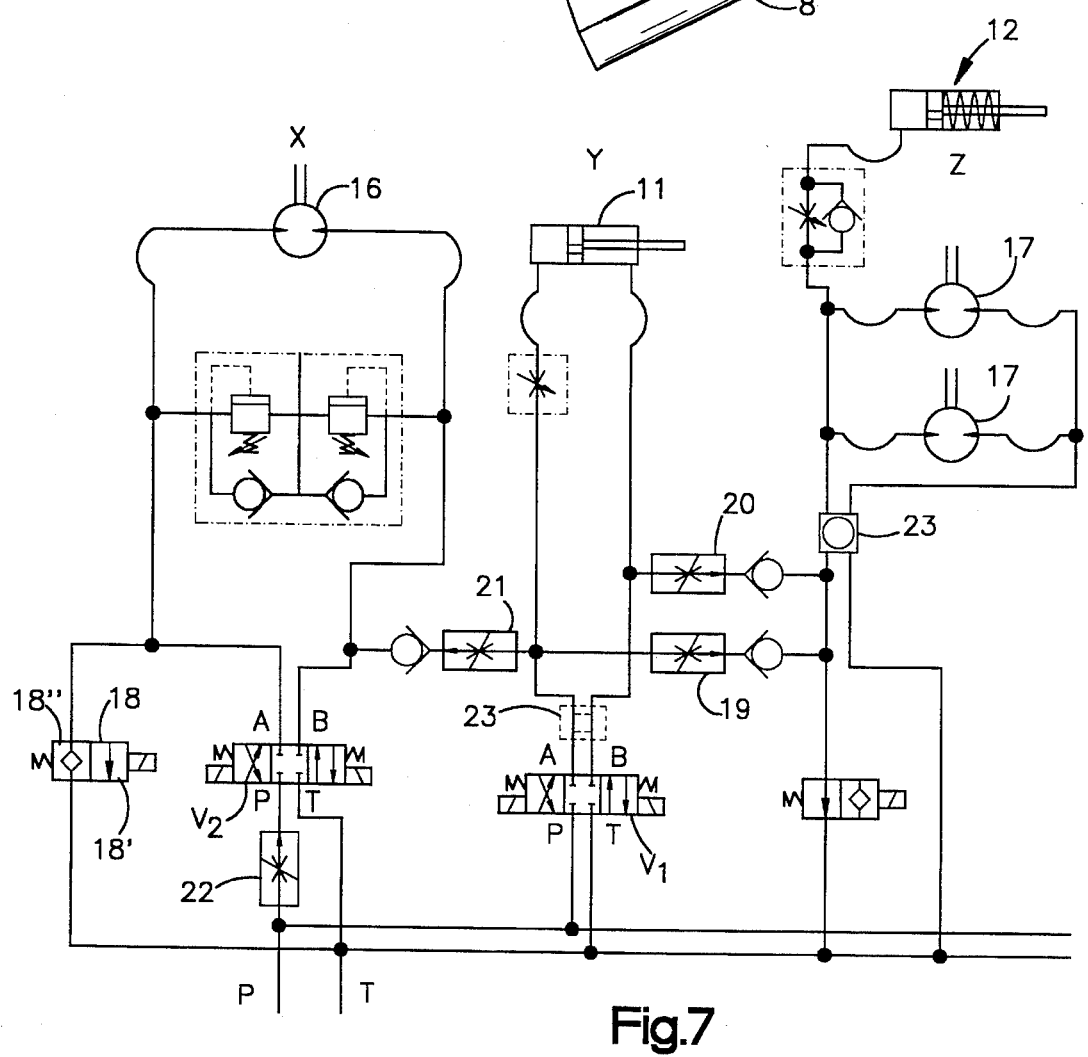
FIG. 7 is a diagram which illustrates the hydraulics of an inventive apparatus functioning to wrap or wind a plastic strip crosswise around a bale, both parallel with and transversely to the horizontal axis of the bale.

In the hydraulic circuit illustrated in FIG. 7 for an arrangement in which both said first winding or wrapping method and said second winding or wrapping method are effected in one and the same station, the reference sign X identifies a system for rotating a bale-carrying table about a vertical axis or for swinging a film magazine around a bale placed on the table. Also shown in the FIG. 7 is a hydraulic motor 16, a system Y which functions to move the film magazine between two positions corresponding to wrapping of a bale in accordance with the first wrapping method and wrapping of the bale in accordance with the second wrapping method, a hydraulic piston 11 by means of which movement of the film magazine is achieved, a system Z for rotating a bale about its horizontal axis, and hydraulic motors 17 which function to drive table rollers. Reference sign $V_1$ identifies a first valve and reference sign $V_2$ identifies a second valve, which are preferably of the so-called closed center type and have two inlets and two outlets and are electromagnetically adjustable. The FIG. 7 system also includes an electromagnetically adjustable check valve 18, adjustable constant flow valves 19, 20, 21, 22 and a swivel 23 which functions to transfer hydraulic medium in a rotating element, in this case the axle 6, or a pivot axle broken-line swivel 23 about which the film magazine is swingably arranged. The reference P identifies a hydraulic pump to which pipes are connected, while reference T identifies a hydraulic medium tank and connected pipes.

Wrapping of a bale in accordance with the first wrapping method is intended to be effected with function b activated by the valve $V_1$, i.e. the P-A and T-B connection, with the check valve 18 open, i.e. the right-hand function 18' activated and not the back function 18". The valve $V_2$ adopts a closed center-position. In this case, the table rotates or the film magazine is swung at a constant speed in a predetermined direction, the hydraulic piston moves the film magazine to a position corresponding to the first wrapping method and the hydraulic motors 17 which function to rotate a bale about its horizontal axis are supplied with working medium through the constant flow valve 19, so as to achieve a satisfactory high bale rotation speed with respect to the rotational/pivotal speed of the table/magazine. Hydraulic medium exiting from the hydraulic motor 16 for the table/magazine returns to the tank via the check valve 18. At the transition to the second wrapping method, the function a of the valve $V_1$, i.e. the P-B or T-A connection, is activated and the function a and the function b of the valve $V_2$ is activated alternately. The check valve adopts its blocking position. This causes the table/magazine to rotate/swing slowly through a limited extent, the hydraulic piston to move the magazine through a position corresponding to the second wrapping method, and the hydraulic motors to rotate the bale about its horizontal axis relatively quickly, via the constant flow valve 20.

The illustrated hydraulic circuit arrangement enables a bale wrapping operation to be controlled very effectively with the aid of relatively few components. The use of a check valve to empty the hydraulic pump in X saves the use of a valve of the $V_1$ and $V_2$ type. Although not shown, the arrangement includes a control unit for controlling the valves in a manner to obtain the desired bale wrapping cycles. In view of, among other things, the considerably accuracy of the constant flow valves used, this control can be based on time measurement for instance, i.e. by activating the two bale wrapping methods during predetermined time periods controlled by the control unit.

The inventive method and the manner of operation of the inventive arrangement will be understood in all essentials from the aforegoing. Thus, subsequent to wrapping a bale with film in accordance with the first bale wrapping method, additional film is wrapped around the bale in accordance with the second bale wrapping method. The bale, which is normally compacted or compressed to some extent in the direction of its horizontal axis by the force exerted by the first elastically tensioned wrapping film, will be compressed radially in a direction transversely to the horizontal axis by the force exerted by the additional film. In this case, the underlying film turns are held and tensioned so as to obtain an extremely tightly wrapped, impervious and durable bale package. The mutually retaining cross-over turns of said further plastic film also generate an elastic holding force around the outer surface of a circular bale or transversely to the long sides of a parallelepipedic bale. This cross-over force is not found with the earlier known bale wrapping methods. The joints between adjacent plastic-film turns is a weak point in packaging of the kind meant here, and by applying a retaining, elastically tensioned plastic-film band around a bale in a cross-over fashion, the weakness of the joints in the plastic film first applied is eliminated and the package will remain tight and impervious for a long period of time.

It will be understood from the aforegoing that the invention provides particularly large benefits in comparison with previously known methods. The risk of the inventive packaging being pervious and allowing the ingress of moisture, etc. is practically non-existent. Furthermore, the use of plastic film is very effective insomuch that the number of turns when wrapping in accordance with the first wrapping method can be reduced considerably compared to the number of turns needed when applying the known technique, since additional film is applied in a retaining and cross-over fashion in accordance with the second bale wrapping method. This will result in a reduction in the amount of film material used, in many cases.

The invention has been described in the aforegoing with reference to different embodiments thereof.

It will be understood, however, that other embodiments and minor modifications are conceivable without departing from the inventive concept.

For example, other devices, such as drive rollers which act on a bale from beneath and/or from above are conceivable for effecting rotation of the bale around said horizontal axis.

Furthermore, the invention is not restricted to the use of round bales, but can be applied very effectively with bales of generally parallelepipedic configuration.

Neither is the invention restricted to ensilage bales, but can be used to wrap bales of varying materials, such as straw, hay, etc.

The term packaging film as used here has a wide interpretation and is intended to cover plastic bands or plastic webs within a wide thickness range.

According to one embodiment which is preferred in some instances, the bale wrapping produced in accordance with said first and said second bale wrapping methods is supplemented with a wrapping of essentially the same kind as that produced by the first wrapping method, subsequent to applying a wrapping in accordance with said second wrapping method. This supplementary wrapping is appropriate in those instances when the cross-over wrapping produced in accordance with the second wrapping method extends out over the ends of the bale. The supplementary wrapping eliminates the risk of pockets forming in the film at the ends of the bale.

The film may also be secured in the second wrapping station in manners different to those described, for instance by pressing the end of the film into the bale.

The pitch of the further, cross-over wrapping produced in accordance with the second wrapping method can be achieved by causing the film magazine to move reciprocatingly along the bale, for instance in guides or the like, essentially parallel with the horizontal axis.

Embodiments are also conceivable in which the further, cross-over wrapping 9" is applied by rotating, swinging, the film magazine about an axis parallel with the bale axis, said bale being preferably supported with its axis generally vertical, so as to leave the outer surface of the bale free. Embodiments of a similar kind are conceivable in which the bale is rotated about its axis and the magazine is not moved around the bale. In both instances, the bale will be supported through the intermediary of one or both end parts of the bale.

The invention is thus not restricted to the aforedescribed and illustrated embodiments, since modifications can be made within the scope of the following claims.

I claim:

1. A method for wrapping a bale of organic material, such as animal-feed for ensiling, straw or hay, in bands of plastic packaging film, said bale having a first axis and a second axis, said first axis being generally longitudinally directed and said second axis being generally transverse to said first axis, comprising the steps of:

dispensing plastic packaging film from a packaging film supply roll spaced from the bale while maintaining the plastic film under tension, wrapping the packaging film around the bale in successive turns with the packaging film supply roll being in an orientation generally transverse to said first axis, the film in each turn around the bale having first turn parts which extend generally parallel with said first axis and second turn parts which extend transversely to said first axis, dispensing further film material from a film material supply roll spaced from the bale while maintaining the further film material under tension, wrapping the bale (1) with further film material (9) with the film material supply roll being in an orientation generally parallel to said first axis, while maintaining the further film material under tension, such that successive film turns (9") of said further film material will cross-over the first turn parts (9''') of the packaging film which extend generally parallel to said first axis (3) in an elastically tensioned and wrapper retaining fashion.

2. A method according to claim 1, wherein said further film material is applied while the bale (1) is rotated solely about said generally first axis.

3. A method according to claim 1, wherein said further film material and said packaging film each have a width direction, said further film material being applied such that the width direction of said further film will extend generally transversely to the width direction of the packaging film.

4. A method according to claim 1, further comprising the step of moving the bale in an oscillatory, limited rotational path about said second axis so as to apply the film turns of said further film material at a desired pitch.

5. A method according to claim 1, further comprising the step of applying the successive turns (9") of said further film material so that said successive turns at least partially overlap one another.

6. A method according to claim 1, wherein the further film material (9) is dispensed from the same supply roll (7) as that from which the packaging film was taken, and wherein the axial direction of the supply roll is moved from a first position generally transverse to said first axis to a second position generally parallel to said first axis in conjunction with application of the further film material (9).

7. A method according to claim 1, further comprising the step of transferring the bale (1) following application of the plastic packaging film to a separate, second bale wrapping station and applying said further film material (9) onto said bale in said separate, second wrapping station.

8. A method according to claim 7, further comprising the step of wrapping the film around at least a part of one fixed turn around the bale so as to secure the film (9) to the bale in said second station, prior to applying said further film material, wherein the plastic packaging film in said fixed turn extends generally parallel with and transversely to the first axis.

9. A method according to claim 7, comprising the further step of withdrawing plastic packaging film from the packaging film supply roll (7) and placing said packaging film on a bale support (5) prior to transferring the bale to said support, such that the film will be clamped firmly between the bale and said bale support prior to commencing wrapping of the bale.

10. A method according to claim 6, comprising the further step of rotating the bale about said first axis in a direction so as to draw said further film material in beneath the bale when applying said further film material.

11. A method according to claim 1, further comprising the step of wrapping the bale with a supplementary wrapping of said plastic packaging film, subsequent to applying the further film material.

12. A method according to claim 1, further comprising the step of swinging the film magazine in an oscillating, limited movement path, at least partly substantially in the direction of said first axis, so as to apply the film turns of said further film material at a desired pitch.

13. A method according to claim 1, wherein said first axis is generally horizontal and said second axis is generally vertical.

14. A method according to claim 13, further comprising the steps of:

simultaneously rotating said bale about said first axis and said second axis during wrapping of said plastic packaging film about said bale; and, rotating said bale solely about said first axis during wrapping of said further film material about said bale.

15. A method according to claim 14, further comprising the step of moving the bale in an oscillatory, limited rotational path about said second axis so as to apply the film turns of said further film material at a desired pitch.

16. A method according to claim 14, further comprising the step of applying the successive turns (9") of said further film material so that said successive turns at least partially overlap one another.

17. A method according to claim 14, wherein the further film material (9) is dispensed from the same supply roll (7) as that from which the packaging film was taken, and wherein the axial direction of the supply roll is moved from a first position generally transverse to said first axis during application of said packaging film to a second position generally parallel to said first axis in conjunction with application of the further film material (9).

18. A method according to claim 14, further comprising the step of transferring the bale (1) following application of the plastic packaging film to a separate, second bale wrapping station and applying said further film material (9) onto said bale in said separate, second wrapping station.

19. A method according to claim 18, comprising the further step of withdrawing plastic packaging film from the packaging film supply roll (7) and placing said packaging film on a bale support (5) prior to transferring the bale to said support, such that the film will be clamped firmly between the bale and said bale support prior to commencing wrapping of the bale.

20. A method according to claim 14, further comprising the step of swinging the film magazine in an oscillating, limited movement path, at least partly substantially in the direction of said first axis, so as to apply the film turns of said further film material at a desired pitch.

* * * * *